July 29, 1924.  
J. M. MEREDITH  
WHEEL RIM  
Filed Feb. 6, 1923  
1,503,426
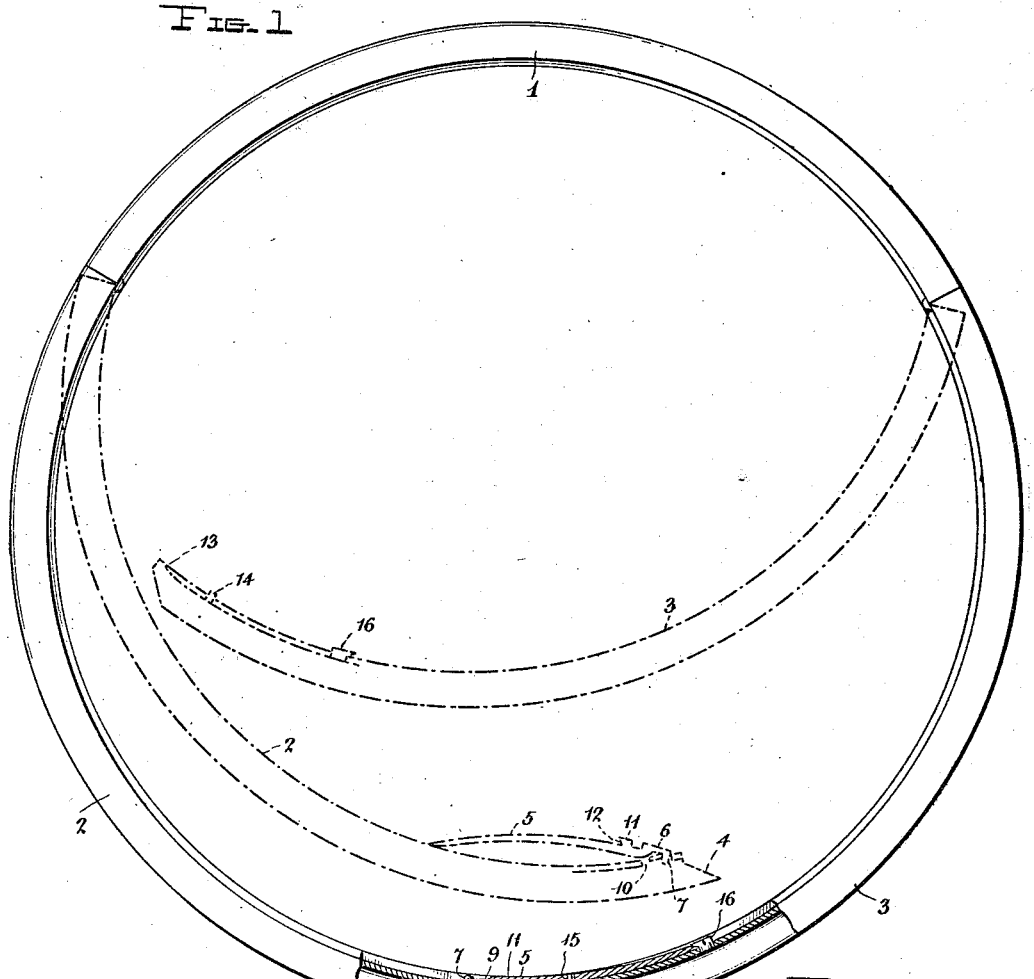
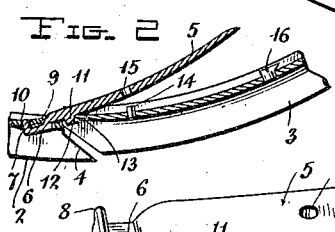
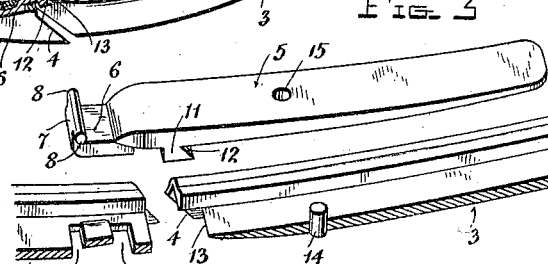
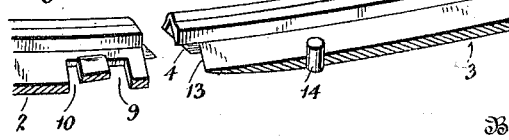
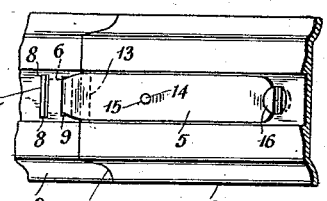
Inventor  
Jaquelin M. Meredith,  
By  
Attorney Patented July 29, 1924.

1,503,426

UNITED STATES PATENT OFFICE.

JAQUELIN M. MEREDITH, OF NORFOLK, VIRGINIA.

WHEEL RIM.

Application filed February 6, 1923. Serial No. 617,320.

*To all whom it may concern:*

Be it known that I, JAQUELIN M. MEREDITH, a citizen of the United States, residing at Norfolk, in the county of Norfolk and State of Virginia, have invented certain new and useful Improvements in Wheel Rims, of which the following is a specification.

This invention relates to collapsible and demountable rims and particularly to that type of rim which is formed of a plurality of hinged sections, and separable at one point, the hinged sections adjacent the point of separation being foldable toward the center of the rim to decrease the compass of the same and to permit its easy introduction within the annulus of the tire.

One of the objects of the invention is the provision of novel means for locking the hinged joints together at their point of separation.

Another object of the invention is the construction of a locking lever for the joint between the two sections, which can be readily removed if desired.

Still another object of the invention is the provision of means associated with the locking lever for tripping one of the hinged sections at the joints, thereby initiating its movement of collapse.

A further object of the invention is to provide means for securing the locking lever to one of the hinged sections at a plurality of points in order to add to the joint when the rim is expanded.

With the above and other objects in view, the invention consists in the improved collapsible and demountable rim illustrated in the accompanying drawings, described in the following specification, and particularly claimed and in such variations and modifications thereof as will be obvious to those skilled in the art to which this invention relates.

In the drawings accompanying and forming a part of this specification, and wherein the preferred embodiment of my invention is illustrated:—

Figure 1 is a side elevation of a collapsible and demountable rim embodying my invention.

Figure 2 is a detail view partly in cross section showing the parts in the position assumed just before the moment of locking.

Figure 3 is a perspective exploded view of the ends of the hinged sections adjacent the joint and the locking lever.

Figure 4 is a plan view of the joint with the locking lever in locked position.

Referring now in detail to the several figures, the numeral 1 represents a section of the rim to which are hingedly secured the sections 2 and 3. The rim is collapsed for removal from the tire by folding the sections 2 and 3 inwardly toward the center of the rim as shown in dotted lines in Figure 1. On account of the direction of slope of the bevel 4 it is obvious that the section 3 must necessarily be the first one to fold inwardly and the last to resume its position in the circumference of the rim.

In order to securely lock the joint between the sections 2 and 3 a locking lever 5 is provided, said lever being furnished with an off-set portion 6 of slightly narrower width than the main portion of said lever and formed with an upwardly bent end 7 provided with laterally extending journal points 8. The rim section 2 is formed with a pair of slots 9 and 10, the slot 9 being of sufficient width to accommodate the off-set portion 6, but too narrow to permit the passage of the apertured end 7 and the journal points 8 when the latter are presented to said slot in a direction parallel with its length. The slot 9 is, however, sufficiently wide to permit the passage of said upturned end and journal points when the latter are presented to it diagonally. The slot 10 is of the same length as the upturned end 7 including the journal points 8 so that the latter may readily pass thereinto. The lever 5 is detachably secured to the rim section 2 by being held radially of said rim section and diagonally of the slot 9 so that the upturned end 7 and the journal point 8 may be passed through the slot 9. Said lever is then turned downwardly until its face lies parallel with the inner surface of the rim, the journal points 8 passing through the slot 10.

The lever in its assembled position is shown in Figures 1 and 2. The object of the journal points is to prevent inadvertent separation of the lever from the rim section 2 when the rim joint is unlocked. At such time the locking lever 5 is raised to a radial position, the upturned end 7 comes out of the slot 10 and the journal points 8 engage the under surface of the walls rotating thereupon during the operative movements of the lever and retaining the latter in place. Said lever can, however, be entirely removed by turning it angularly so as to present the journal points in the direction of the diagonal of the slot 9. The under side of the locking lever 5 is formed with a projecting lug 11 having an undercut recess 12 formed in its front face and extending the full width of the lever.

The front edge of the rim section 3 is formed with a recess 13 preferably of slightly narrower width than the widest portion of the lug 12. When the parts are in the position shown in Figure 2 the rim section 2 has returned to its position in the circle of the expanded rim while the rim section 3 has not quite assumed its fully expanded position. When the two rim sections are relatively so situated the space between them including the recess 13 is sufficiently wide to let the lug 11 slip through, the locking lever 5 then forcing down the rim section 3 until the bevel thereof contacts with the bevel of the rim section 2, the edge of the rim section 3 entering the recess 12 in the lug 11. A pin 14 projects inwardly from the rim section 3 and registers with an aperture 15 in the locking lever 5 when the latter is in fully locked position. A rotatable member 16 which is in the form of a screw having part of the head thereof cut away is attached to the rim section 3 in a position to engage the extreme edge of the locking lever 5. By means of the interengaging relation of the lug 11 and the front edge of the rim section 3, and by the engagement of the screw 16 with the end of the locking lever 5 I have provided a plurality of means at an appreciable distance apart for holding the locking lever and the rim section 3 rigidly together thus materially strengthening the joint between said rim sections.

In the operation of my device, in order to cause the collapse of the rim, the screw 16 is turned to release the locking lever 15. The latter is then pulled away from the rim as shown in Figure 2. This causes the lug 11 to draw the end of the rim section 3 inwardly of the rim thus initiating the collapse of the latter. This much having been accomplished, the complete collapse of the rim is obtained by pushing the sections 2 and 3 inwardly with the hands.

It will be understood that various changes may be made in the form and relation of the parts to suit different requirements of use, and that the invention, therefore, is not limited to the precise details of construction and arrangement shown.

Having described my invention what I claim as new and desire to secure by Letters Patent, is:—

1. A collapsible rim provided with a split joint, said rim being formed with a transverse slot adjacent one side of said joint, a lever having an end thereof passing through said slot and provided with an extension to prevent its withdrawal from the slot when in one position, said slot being so shaped as to permit withdrawal of said lever when in another position, and means on the other side of said joint cooperating in interlocking relation with said lever.

2. A collapsible rim provided with a split joint, said rim being formed adjacent one side of said joint with a pair of transverse slots leaving a bridge of metal therebetween, a lever passing through one of said slots and having an off-set portion embracing said bridge of metal, and fitting into the other of said slots, said off-set portion being formed with an extension to prevent withdrawal of said lever from the slot when in one position, said slot being so shaped as to permit withdrawal of said lever when in another position, and means on the other side of said joint cooperating in interlocking relation with said lever.

3. A collapsible rim provided with a split joint, said rim being formed adjacent one side of said joint with a pair of transverse slots of unequal length having a bridge of metal therebetween, a lever passing through one of said slots and having an off-set portion embracing said bridge of metal and formed with an extension fitting lengthwise the longer slot but longer than the length of the shorter slot, the latter being of sufficient width to permit the passage therethrough of said extension when the latter is presented diagonally for detaching said lever from said rim, and means on the other side of said joint cooperating in interlocking relation with said lever.

4. A collapsible rim provided with a split joint, said rim being formed adjacent one side of said joint with a pair of transverse slots of unequal length having a bridge of metal therebetween, a lever passing through one of said slots and having an off-set portion embracing said bridge of metal and formed with an extension fitting lengthwise the longer slot but longer than the length of the shorter slot, the latter being of sufficient width to permit the passage therethrough of said extension when the latter is presented diagonally for detaching said lever from said rim, means associated with said lever and engageable with the edge of the rim at the other side of said joint for initiating the collapse of said rim and interlocking means on the other side of said joint and said lever.

In testimony whereof I have hereunto set my hand.

JAQUELIN M. MEREDITH.